March 20, 1962 W. G. KNIFFIN 3,025,682
ICE BLOCK MAKING AND HARVESTING
Filed Feb. 17, 1961
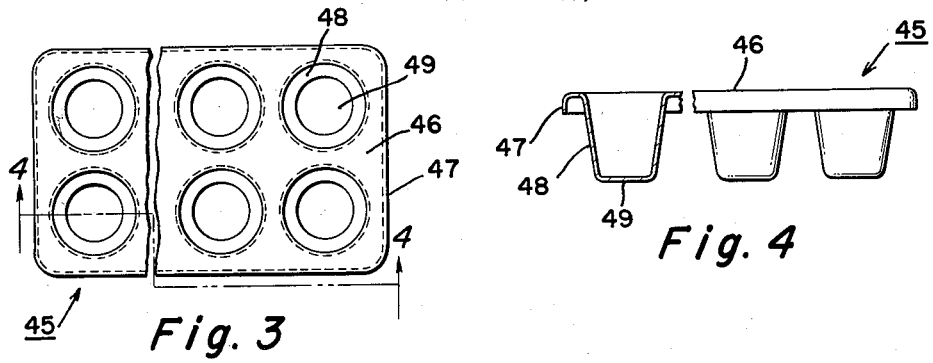
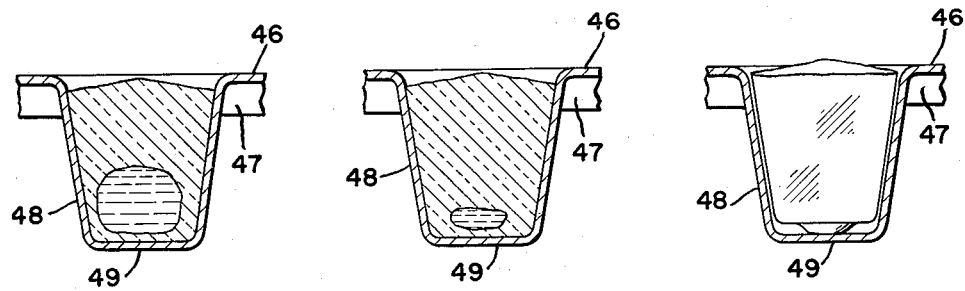
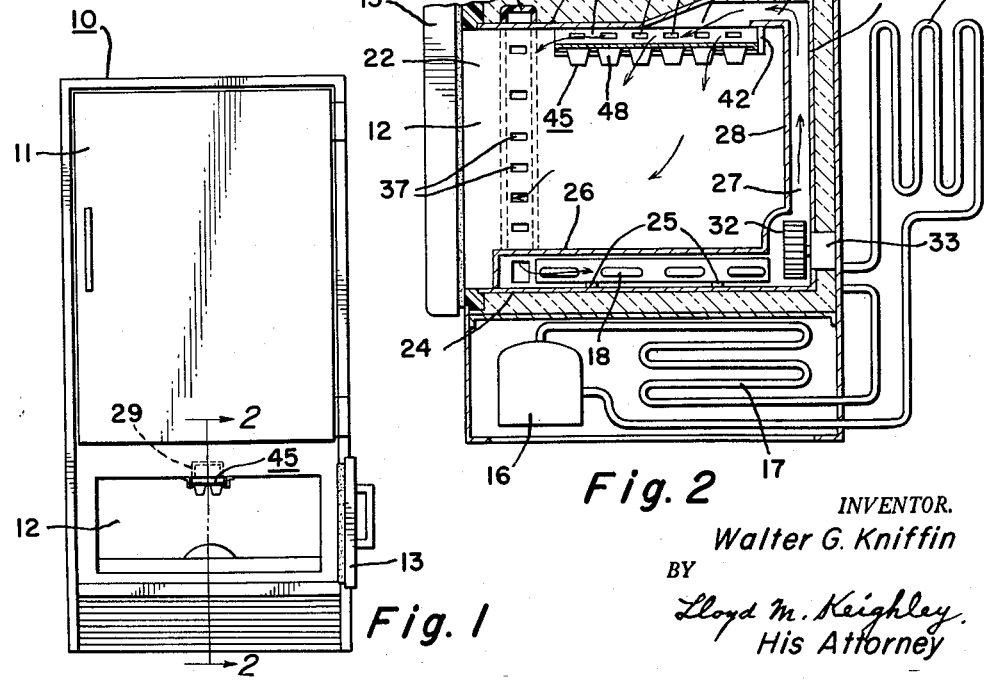
INVENTOR.
Walter G. Kniffin
BY Lloyd M. Keighley
His Attorney

United States Patent Office 3,025,682
Patented Mar. 20, 1962

3,025,682
ICE BLOCK MAKING AND HARVESTING
Walter G. Kniffin, Dayton, Ohio, assignor to General Motors Corporation, Detroit, Mich., a corporation of Delaware
Filed Feb. 17, 1961, Ser. No. 90,081
6 Claims. (Cl. 62—340)

This invention relates to refrigeration and particularly to making and harvesting ice blocks from a freezing device employed in household refrigerators.

Household refrigerators heretofore placed on the market have been equipped with ice molds or freezing devices of the tray and grid type and a combined ice block storage receptacle and ice block ejector. A user of the refrigerator is required to remove a mold or freezing device containing ice blocks from a chamber of the refrigerator and to manipulate the device into association with or support upon the combined receptacle-ejector prior to releasing ice blocks from the freezing device. Many users of these refrigerators have objected to this ice block releasing or harvesting method because of the plurality of transfers of the freezing device requiring too much handling of such a cold device. In order to overcome this objection and facilitate an operation of harvesting ice blocks from a refrigerator, I propose a freezing arrangement and a freezing device wherein ice blocks contained therein are automatically or self-loosened from walls of the compartments in the device during the process of freezing water in the device within a chamber of a refrigerator and prior to removing same therefrom whereby the preloosened ice blocks are readied for release from the freezing device immediately upon removing same from the chamber and inverting the device outside thereof. In this connection it is desired to point out that the present-day manner of cooling a frozen food storage or freezing chamber of household refrigerators by discharging very low temperatured air thereinto abets my proposition and plays an important roll in rendering same practical by virtue of obtaining rapid freezing of water contained in a mold or freezing device placed in the chamber.

An object of my invention is to provide an improved method of and arrangement for quickly freezing water into ice blocks within a freezing device placed in a chamber of a refrigerating apparatus or household refrigerator and to utilize the rapid and final freezing of the water for breaking bonds between the ice blocks and walls of the device whereby ice blocks preloosened therein are releasable therefrom upon removing of the device from the chamber so as to eliminate employment of mechanical ice block ejectors or mechanisms on the device and/or association of the device with such mechanisms.

Another object of my invention is to freeze water in a mold or compartments of a freezing device by exposing the water to direct contact of a concentrated stream of cold air discharged into a chamber of a refrigerator while the mold or device is supported in spaced relation to walls of the chamber and out of engagement and thermal conductive relationship with an evaporator of a refrigerating system which chills air of the stream thereof.

In carrying out the foregoing objects, it is a further and more specific object of my invention to provide an arrangement within a household refrigerator cabinet which reduces time required to freeze water in a mold or compartments of a freezing device placed in a chamber therein into an ice block or blocks, automatically loosens the ice block or blocks from walls of the mold or device during the freezing period to ready them for release therefrom prior to removal of the mold or device from the chamber, and which arrangement generally facilitates harvesting of ice blocks with a minimum of effort or handling of a cold mold or freezing device on the part of the user of the refrigerator.

Further objects and advantages of the present invention will be apparent from the following description, reference being had to the accompanying drawings wherein a preferred embodiment of the present invention is clearly shown.

In the drawings:

FIGURE 1 is a front view of a multiple-chambered household refrigerating apparatus or cabinet with its freezing or frozen food storage chamber door opened showing a mold or freezing device supported therein and adapted to have water frozen into ice blocks in a manner herein disclosed;

FIGURE 2 is an enlarged fragmentary sectional view taken along the line 2—2 of FIGURE 1 showing a refrigerating system diagrammatically associated with the refrigerator cabinet;

FIGURE 3 is a broken top view of a freezing device employed in the present invention;

FIGURE 4 is a side view of the freezing device taken along the line 4—4 of FIGURE 3 partly in section and partly in elevation;

FIGURES 5 and 6 are enlarged cross-sectional views through one of the molds or receptacles of the freezing device illustrating stages in the freezing of water therein into an ice block; and FIGURE 7 is a view similar to FIGURES 5 and 6 showing an ice block loosened from walls of the mold or receptacle.

Before proceeding with a description of the present disclosure, it is desired to set forth that water has previously been frozen in molds or freezing devices from the top downwardly into ice blocks therein both by conduction and by radiation from a cold surface such, for example, by mounting a freezing device on a surface of an evaporator of a refrigerating system and by supporting a freezing device in close proximity to a cold or refrigerated surface respectively. These arrangements have not been entirely satisfactory because the rate at which the water is congealed or frozen is slow, and consequently final freezing of the water into a solid ice block tends to bond a portion of the block to a wall of the mold or freezing device. The interior of a frozen food storage or freezing chamber of many present-day household refrigerators is now cooled solely by drawing air out of the chamber over and through a refrigerant evaporator outside the chamber and discharging the air at a low temperature well below 32° F. back into the chamber. These refrigerators are of a type commonly referred to as "no frost" or "frost proof" refrigerators. Characteristics of such refrigerators greatly contribute to the success and practicability of the present improvement or combination and to the long yearning of refrigerator manufacturers in obtaining faster freezing of water into ice blocks in a mold or freezing device placed in a chamber of a refrigerator. Such has resulted in the provision of several features in a refrigerator which have appealed to the public, enhances their utility by users thereof and have increased their saleability. The present disclosure is one of these features and provides quicker making of ice blocks in a household refrigerator and easier harvesting of the ice blocks therefrom with a minimum of handling of a cold ice block mold or freezing device during an ice block harvesting operation.

Referring now to the drawings, for illustrating my improvement invention, there is shown in FIGURE 1 thereof a refrigerating apparatus of the multichambered household refrigerator type comprising a cabinet having walls defining an upper unfrozen food storage chamber (not shown), normally closed by an insulated door 11, and a lower frozen food storage or freezing chamber 12, insulated from the upper chamber, with its insulated door 13 in open position. Insulation 14 within walls of cabinet 10 (see FIGURE 2) may be of any suitable or conventional material. The interior of upper chamber in cabinet 10 is cooled to a temperature above freezing, say, between 37° and 43° F., preferably by a plate-like sheet metal refrigerant evaporator, diagrammatically illustrated by the reference numeral 15 in FIGURE 2, of a refrigerating system associated with the apparatus or cabinet 10. This refrigerating system also includes a sealed motor-compressor unit 16, a condenser 17 and another evaporator 18, all connected to one another by suitable pipes or conduits as is conventional in the art. The interior of lower chamber 12 of cabinet 10 is cooled to a temperature well below 32° F. by the evaporator 18 of the refrigerating system for freezing foods, storing frozen foods and/or for freezing water in molds or a freezing device into ice blocks for table use in chilling salads or the like and drinks in glasses. Wire-like slidable shelves, drawers or baskets may be mounted in chamber 12 for supporting packages of frozen foods or the like therein.

Chamber 12 includes a box-like liner having integral top, side and rear walls 21, 22 and 23 respectively and a bottom wall 24. Evaporator 18 is supported on chamber wall 24 by a plurality of small insulated spacers 25, out of contact or thermal conductive relationship therewith and this evaporator is preferably of the finned type having a sheathed electric heater incorporated therein and extending across the fins thereof. A false bottom 26 is secured in chamber 12, spaced from evaporator 18, and provides an air inlet duct across the lower part of the chamber which communicates with a centrally located air duct 27 at the rear of cabinet 10 formed by an upright wall 28. The spacing of false bottom 26 from evaporator 18 and support of this evaporator on the insulators 25 mount same beyond walls of chamber 12 out of thermal conductive relationship therewith. Walls 23 and 28 cooperate with one another to provide a horizontal extension 29 of duct 27 communicating with chamber 12 by way of opening 31 located in the central portion of top wall 21. A fan or blower 32 is mounted at the juncture of the air inlet duct, beneath false bottom 26, and upright duct 27. Blower or fan 32 is directly connected to and driven by an electric motor 33 located outside chamber 12. Air is drawn out of chamber 12 through openings 37 in the front portion of the chamber side walls 22 through suitable air duct channel members 38 beyond these walls into the inlet duct beneath false bottom 26 by fan or blower 32 and is forced over and around evaporator 18 whereby the air is chilled to a very low temperature of from 0° to 10° F. This chilled air is circulated upwardly in duct 27, by blower 32, forwardly in duct extension 29 and is discharged at such low temperature into the uppermost portion of chamber 12 by way of opening 31 in a concentrated stream. A refrigerator having an arrangement as disclosed is herein only briefly described, and I therefore make reference to the L. J. Mann Patent No. 2,912,834 dated November 17, 1959, and assigned to the assignee of this application. The Mann patent contains a more complete or full detailed description of the arrangement, the refrigerating system, etc. As hereinbefore explained, a refrigerating apparatus of the type herein illustrated and slightly modified over that shown in the Mann patent greatly contributes to the feasibility of my invention due to the low temperature of air discharged into chamber 12.

It is to be noted that opposed spaced-apart guide or support means 39 are provided at opposite sides of opening 31 in top wall 21 of chamber 12 which are stationarily secured, in any suitable or well-known manner, by screws, bolts or the like, to the upper chamber wall and depend therefrom. These guides or supports are preferably formed of a nonmetallic material having low heat conductive properties provided with a plurality of spaced-apart apertures 41 along their length and rear stop shoulders 42. Ledge-like supports or guides 39 are adapted to suspendingly support a mold or freezing device, generally represented by reference numeral 45, therefrom within chamber 12 spaced a predetermined distance below the chamber top wall 21 directly below air discharge opening 31 therein. The mold or freezing device 45 is spaced from walls of chamber 12 and is consequently out of thermal conductive relationship therewith and does not engage evaporator 18. Freezing device 45 is best shown in FIGURES 3 and 4 of the drawings and can be formed of any suitable or desirable material such as molded plastic material or a metal preferably of low heat conducting properties. The freezing device is a tray or pan-like element including a flat closed top portion 46 having a down turned bounding flange 47 therearound and depending walls 48 and 49 forming sides and bottoms respectively of a plurality of molds, receptacles or compartments, preferably, although not necessarily, cylindrical in horizontal cross section. Upright side walls 48 are inclined with respect to the vertical or, in other words, converged downwardly toward bottom walls 49 to provide open top molds or compartments in freezing device 45 adapted to receive and retain water therein to be frozen.

In accordance with my invention I substantially fill the receptacles or compartments of freezing device or mold 45 with water and place same in chamber 12 suspendingly supported on the guide rails or supports 39 against stop shoulders 42 thereon to space the device from walls of the chamber. This supported position of device 45 locates the open top molds or compartments in the path of the concentrated stream of 0° to 10° F. air egressing from the duct extension 29 and discharged into chamber 12 through opening 31. The chilled air entering chamber 12 flows over and into direct contact with water in the open top molds or compartments and spills over the sides of device 45, through the plurality of apertures 41 in supports 39, and over the front of the device into the chamber for refrigerating contents thereof. While the top part of device 45 is directly and constantly exposed to the extreme cold air discharged into chamber 12, flat closed portion 46 and the bounding flange 47 around the device shields walls 48 and 49 thereof from or secludes these walls out of the path of this cold air stream. Additional means may, if desired, be employed to shield or protect walls 48 and 49 from direct contact by the concentrated cold air stream. For example, these mold or compartment walls could be coated with a layer of any suitable or conventional insulating material. However, the present illustration indicates such additional means unnecessary since the closed or flat upper portion 46 of device 45 amply shields or protects the compartment walls. By virtue of shielding and secluding walls 48 and 49 of the receptacles or compartments as described, and of an inherent temperature differential between the 0° to 10° F. concentrated cold air stream entering chamber 12 and somewhat quieter 10° F.+ air in the main portion of the chamber, water in the molds or compartment of device 45 congeals or freezes into ice blocks in a direction from the top downwardly therein. Freezing of the ice blocks occurs with a rapidity which causes final freezing of the water to substantially explode and expand toward the bottom 49 of the molds or compartments. This final freezing and expansion of the ice blocks reacts against the bottom 49 of the molds or compartments with a suddenness to force the blocks of ice to shift upwardly therein, relative to their side walls 48, and the ice blocks are thereby automatically or self-loosened from the mold or compartment walls. FIGURES 5, 6 and 7 of the drawings depict the freezing stages of water in the molds or compartments and loosening of ice blocks from their walls. The ice blocks are frozen solid at the time they are shifted upwardly in the mold or compartments so that no water exists therein to cause bonding or binding of the blocks to walls thereof. When this occurs the shape of the ice blocks is slightly changed from the form in which they have been freezing because the pressure of water trapped in the pocket of the ice blocks fractures the bottom wall thereof to instantly release this pressure and the released pressure together with the low temperature of the mold or freezing device cooperate to simultaneously flash the water into ice. Freezing of water in a mold or compartments of a freezing device directly exposed to and disposed in the path of a 0° to 10° F. temperatured concentrated air stream discharged into a chamber as herein disclosed occurs with a rapidity unequaled by radiating cold air to or upon the water and/or by conduction of heat from the water to a refrigerated surface through metal of the best-known conductive properties. In the present disclosure evaporator 18 of the refrigerating system is out of thermal conductive relationship with walls of chamber 12 containing mold or device 45 which is supported in spaced relation to walls of the chamber out of engagement with the evaporator and these characteristics of my arrangement are to be distinguished in this manner from prior ice block freezing constructions, combinations or methods. After freezing and self-loosening ice blocks from walls of the molds or compartments of device 45, this device is then removed from supports 39 within chamber 12 and is rotated outside the chamber into a substantially inverted position over an ice bucket, receptacle or the like so that the preloosened ice blocks gravitationally fall out of the compartments of the freezing mold or device upon shaking or lightly tapping same.

From the foregoing it should be apparent that I have provided an improved method of and arrangement for making ice blocks in a household refrigerator and a novel manner of harvesting same from a mold or freezing device in which they are frozen. By rapidly freezing water into ice blocks in the path of a concentrated cold air stream to loosen the frozen blocks from walls of a mold or freezing device before the device is removed from a chamber of a refrigerator, the ice blocks are rendered immediately available for harvest and this saves considerable time in an ice block harvesting operation. This lessens the amount of handling, transferring and other motions or acts of a freezing device heretofore required of a housewife in harvesting ice blocks. My innovation or improvement is unique as compared to former arrangements wherein a grid must be removed from a tray before ice blocks can be harvested from the tray and/or of removing a unitary tray and grid type freezing device from a freezing chamber and repositioning same in an inverted supported position on an ice block ejector device in the chamber. It should be appreciated that my novel arrangement produces a result heretofore unobtainable in refrigerators wherein a refrigerant evaporator of a refrigerating system has been located within a food storage chamber and directly exposed to air therein for creating a thermo siphon circulation of the air above 32° F. in the chamber to cool same. The improvement herein disclosed accomplishes a long sought for desire in the ice block making and harvesting art.

While the embodiment of the present invention as herein disclosed constitutes a preferred form, it is to be understood that other forms might be adopted.

What is claimed is as follows:

1. An ice making apparatus comprising in combination, a chamber, a refrigerating system including a refrigerant evaporator located beyond walls of said chamber out of thermal conductive relationship therewith and chilling air in a portion of said apparatus to a sub-water freezing temperature, means for discharging air chilled by said evaporator in a concentrated stream thereof into said chamber, a mold having an open top and walls forming sides and a rigid bottom of a compartment therein adapted to receive water to be frozen, means for supporting said mold in an upright position in the chamber out of contact with said evaporator in the path of flow of said concentrated chilled air stream discharged into said chamber, the chilled air entering said chamber being directed over said mold into engagement with the surface of water in the open top compartment, said mold shielding and secluding walls of said compartment from said chilled air stream in a temperature environment within said chamber above the temperature of said discharged air whereby water in that part of the compartment bounded by said shielded secluded walls freezes from the top downwardly therein into an ice block, the final freezing of water in said compartment causing same to expand and react against the rigid bottom thereof for self-loosening the ice block therefrom and for substantially simultaneously therewith bodily shifting the block upwardly with respect thereto, said mold together with the loosened block of ice therein being movable into a position for ejecting said ice block from said compartment, and walls of the compartment of said mold being immovable relative to one another during freezing, loosening, shifting and ejection of said ice block.

2. An ice making apparatus comprising in combination, a chamber, a refrigerating system including a refrigerant evaporator located beyond walls of said chamber out of thermal conductive relationship therewith and chilling air in a portion of said apparatus to a subwater freezing temperature, means for discharging air chilled by said evaporator in a concentrated stream thereof into said chamber, a pan-like freezing device having a flat top wall and depressions therein forming side walls and a rigid bottom wall of compartments adapted to receive water to be frozen, means for supporting said device in an upright position in the chamber out of contact with said evaporator in the path of flow of said concentrated chilled air stream discharged into said chamber, the chilled air entering said chamber being directed over said device into engagement with the surface of water in said compartments, said flat top wall of the pan-like freezing device shielding and secluding walls of said compartments therebelow from said chilled air stream in a temperature environment within said chamber above the temperature of said discharged air whereby water in that part of each compartment bounded by said shielded secluded walls freezes from the top downwardly therein into ice blocks, the final freezing of water in said compartments causing same to expand and react against the rigid bottom wall thereof for self-loosening each ice block therefrom and for substantially simultaneously therewith bodily shifting them upwardly with respect thereto, said freezing device together with the loosened blocks of ice therein being movable from said supporting means into a position for emptying all of the ice blocks out of said compartments, and the walls of said compartments of said device being immovable relative to one another during freezing, loosening, shifting and emptying of said ice blocks.

3. In the art of making and harvesting ice from a mold having an open top and walls providing a rigid bottom and sides of a compartment containing water disposed within a chamber out of thermal conductive relationship with an evaporator of a refrigerating system associated with said chamber and located beyond walls thereof out of contact therewith which comprises; supporting said mold in an upright position in said chamber, discharging air cooled to a sub-water freezing temperature by said evaporator in a concentrated chilled stream thereof into said chamber over said mold into engagement with the surface of water in said compartment, utilizing the mold to shield and seclude walls of said compartment therein from the concentrated chilled air stream in a temperature environment within said chamber above the temperature of air discharged over said mold for freezing the water progressively from top downwardly in the compartment into an ice block, employing final freezing of the water for causing its expansion and reaction against said rigid bottom of the compartment to self-loosen the ice block therefrom and to substantially simultaneously therewith bodily shift the block of ice upwardly with respect thereto, moving said mold together with the loosened ice block therein as a unit into a position for ejecting said ice block therefrom, and preventing relative movement of walls of the compartment of said device during freezing, loosening, shifting and ejection of said ice block.

4. In the art of making and harvesting ice from a pan-like freezing device having a flat top and depressions therein providing a rigid bottom and side walls of compartments containing water disposed within a chamber out of thermal conductive relationship with an evaporator of a refrigerating system associated with said chamber and located beyond walls thereof out of contact therewith which comprises; supporting said device in the chamber with its flat top positioned above walls of said compartments, discharging air cooled to a sub-water freezing temperature by said evaporator in a concentrated chilled stream thereof into said chamber over said freezing device into engagement with the surface of water in said compartments, utilizing said flat top of the pan-like device to shield and seclude walls of said compartments therebelow from the concentrated chilled air stream in a temperature environment within said chamber above the temperature of air discharged over said device for freezing the water progressively from top downwardly in the compartments into ice blocks, employing final freezing of the water for causing its expansion and reaction against said rigid bottom of the compartments to self-loosen the ice blocks therefrom and to substantially simultaneously therewith bodily shift them upwardly with respect thereto, moving said freezing device together with the loosened blocks of ice therein as a unit into a position for ejecting said ice blocks therefrom, and preventing relative movement of walls of compartments of said device during freezing, loosening, shifting and ejection of said ice blocks.

5. In combination, a refrigerator having a chamber therein, a refrigerating system including a refrigerant evaporator located beyond walls of said chamber out of thermal conductive relationship therewith and chilling air in a portion of the refrigerator to a subwater freezing temperature, means for discharging air chilled by said evaporator in a concentrated stream thereof into said chamber, a unitary pan-like freezing device having a top wall and depressions therein forming side walls and a rigid bottom wall of a plurality of compartments adapted to receive water to be frozen, said pan-like freezing device being, after filling said compartments thereof with water externally of the chamber, placeable in a stationary upright supported position within said chamber out of contact with said evaporator in the path of flow of said concentrated air stream discharged into the chamber, the chilled air entering said chamber being directed over the top of said device into engagement with the surface of water in said compartments, said top wall of the pan-like freezing device shielding and secluding walls of said compartments therebelow from said chilled air stream in a temperature environment within said chamber above the temperature of said discharged air whereby water in that part of each compartment bounded by said shielded secluded walls freezes from top downwardly therein into ice blocks, the final freezing of water in said compartments causing same to expand and react against the rigid bottom wall thereof for self-loosening ice blocks therefrom and for substantially simultaneously therewith bodily shifting them upwardly with respect thereto while the freezing device is stationarily supported within said chamber, said freezing device together with the loosened blocks of ice therein being removable from said chamber and rotatable into an inverted position exteriorly thereof for emptying the ice blocks from said compartments outside of said chamber, and the walls of said compartments of said device being immovable relative to one another during freezing, loosening, shifting and emptying of said ice blocks.

6. In combination, a refrigerator having a chamber therein, a refrigerating system including a refrigerant evaporator located beyond walls of said chamber out of thermal conductive relationship therewith and chilling air in a portion of the refrigerator to a temperature between 0° to 10° F., means for discharging the 0° to 10° F. air chilled by said evaporator in a concentrated stream thereof into said chamber to cool the main body portion thereof to a temperature above 10° F. and below 32° F., a unitary pan-like freezing device having a top wall and depressions therein forming side walls and a rigid bottom wall of a plurality of compartments adapted to receive water to be frozen, said pan-like freezing device being, after filling said compartments thereof with water externally of the chamber, placeable in a stationary upright supported position within said chamber out of contact with said evaporator in the path of flow of said concentrated chilled air stream discharged into the chamber, the 0° to 10° F. chilled air discharged into said chamber being directed over the top of said device into engagement with the surface of water in said compartments before entering said main body portion of the chamber, said top wall of the pan-like freezing device shielding and secluding walls of said compartments therebelow from said chilled air stream within the higher cool temperature in said main body portion of said chamber whereby water in that part of each compartment bounded by said shielded secluded walls freezes from top downwardly therein into ice blocks, the final freezing of water in said compartments causing same to expand and react against the rigid bottom wall thereof for self-loosening ice blocks therefrom and for substantially simultaneously therewith bodily shifting them upwardly with respect thereto while the freezing device is stationarily supported within said chamber, said freezing device together with the loosened blocks of ice therein being removable from said chamber and rotatable into an inverted position exteriorly thereof for emptying the ice blocks from said compartments outside of said refrigerator, and the walls of said compartments of said device being immovable relative to one another during freezing, loosening, shifting and emptying of said ice blocks.

References Cited in the file of this patent
UNITED STATES PATENTS

| | | |
|---|---|---|
| 1,824,309 | Storer | Sept. 22, 1931 |
| 1,976,147 | Smith | Oct. 9, 1934 |
| 2,037,417 | Hull | Apr. 14, 1936 |
| 2,100,288 | Horlacher | Nov. 23, 1937 |
| 2,296,327 | Barish | Sept. 23, 1942 |
| 2,438,466 | Tobey | Mar. 23, 1948 |
| 2,487,408 | Askin | Nov. 8, 1949 |
| 2,704,927 | Carrell | Mar. 29, 1955 |
| 2,844,009 | Buchanan | July 22, 1958 |
| 2,971,346 | Frei | Feb. 14, 1961 |

Notice of Adverse Decision in Interference

In Interference No. 93,359 involving Patent No. 3,025,682, W. G. Kniffin, Ice block making and harvesting, final judgment adverse to the patentee was rendered July 27, 1964, as to claims 1, 2, 3, 4, 5, and 6.

[*Official Gazette December 22, 1964.*]